US009424342B1

(12) United States Patent
Ravichandran et al.

(10) Patent No.: US 9,424,342 B1
(45) Date of Patent: Aug. 23, 2016

(54) GEOGRAPHICALLY LOCAL QUERY DETECTION

(75) Inventors: Deepak Ravichandran, Mountain View, CA (US); Dandapani Sivakumar, Cupertino, CA (US); Rohan Seth, San Francisco, CA (US); Shumeet Baluja, Leesburg, VA (US)

(73) Assignee: GOOGLE INC., Mountain View, CA (US)

( * ) Notice: Subject to any disclaimer, the term of this patent is extended or adjusted under 35 U.S.C. 154(b) by 1679 days.

(21) Appl. No.: 12/708,583

(22) Filed: Feb. 19, 2010

(51) Int. Cl.
*G06F 17/30* (2006.01)

(52) U.S. Cl.
CPC ...... *G06F 17/30637* (2013.01); *G06F 17/3087* (2013.01)

(58) Field of Classification Search
USPC ........................................................ 707/722
See application file for complete search history.

(56) References Cited

U.S. PATENT DOCUMENTS

| 7,650,431 | B2 | 1/2010 | Wang et al. |
| 8,024,454 | B2 * | 9/2011 | Campbell et al. ............. 709/224 |
| 2008/0222119 | A1 | 9/2008 | Dai et al. |
| 2009/0019066 | A1 | 1/2009 | Wang et al. |
| 2010/0174703 | A1 * | 7/2010 | Dandekar et al. ............. 707/722 |

* cited by examiner

*Primary Examiner* — Albert Phillips, III
(74) *Attorney, Agent, or Firm* — Mashall, Gerstein & Borun LLP

(57) ABSTRACT

Methods, systems, and apparatus, including computer programs encoded on a computer storage medium, for detecting local search queries. In one aspect, a method includes accessing a search query log that includes data specifying search queries corresponding to particular geographic regions and for at least one of the search queries corresponding to the particular geographic region generating a geo-query count that represents a total number of times that the search query was received over a specified period. The geo-query count is compared to a corresponding expected query count for the search query, where the expected query count is a baseline number of times that the query is expected to be received. In response to determining that the search query has a geo-query count that exceeds the corresponding expected query count by at least a threshold amount, the particular query is classified as a local query for the particular geographic region.

16 Claims, 5 Drawing Sheets

GEOGRAPHICALLY LOCAL QUERY DETECTION

BACKGROUND

This specification relates to search query analysis.

The Internet provides access to a wide variety of resources such as video or audio files, web pages for particular subjects, book articles, or news articles. A search system can identify resources in response to a text query that includes one or more search terms or phrases. The search system ranks the resources based on their relevance to the query and on measures of quality of the resources and provides search results that link to the identified resources. The search results are typically ordered for viewing according to the rank.

Some search systems can obtain or infer a location of a user device from which a search query was received and include local search results that are responsive to the search query. Local search results are search results that have been classified as having local significance to the particular location of the user device. For example, in response to a search query for "coffee shop," the search system may provide local search results that reference web pages for coffee shops near the location of the user device. Many users in various geographic regions will likely be satisfied with receiving local results for coffee shops in response to the search query "coffee shop" because it is likely that a user submitting the query "coffee shop" is interested in search results for local coffee shops.

However, there are some search queries that may have higher local significance in one geographic region than other geographic regions. For example, most users in the United States that submit the search query "rock quarry" are likely to be satisfied receiving non-local search results, such as search results referencing informational web pages that describe rock quarries. However, there may be a geographic region where a rock quarry is a local tourist attraction, such that users in that geographic region may be more interested in receiving a search result referencing the tourist attraction rather than search results referencing informational web pages about rock quarries in general. In these geographic regions, users may be more satisfied if the reference to the tourist attraction is emphasized relative to the other search results.

SUMMARY

This specification describes technologies relating to search query analysis.

In general, one innovative aspect of the subject matter described in this specification can be embodied in methods that include the actions of accessing a search query log that includes data specifying search queries corresponding to particular geographic regions; for at least one of the search queries corresponding to the particular geographic region, performing the following actions: generating a geo-query count that represents a total number of times that the search query was received over a specified period; comparing the geo-query count to a corresponding expected query count for the search query, the expected query count being a baseline number of times that the query is expected to be received; and in response to determining that the search query has a geo-query count that exceeds the corresponding expected query count by at least a threshold amount, classifying the particular query as a local query for the particular geographic region. Other embodiments of this aspect include corresponding systems, apparatus, and computer programs, configured to perform the actions of the methods, encoded on computer storage devices.

These and other embodiments can each optionally include one or more of the following features. Methods can further include the action adjusting an initial result score for at least one local search result that has been selected to be provided in response to receiving the local query, the initial result score being a score used to select an order in which search results are presented, and the local search result being a search result that references a resource that corresponds to the particular geographic region.

Methods can further include the actions accessing a search query associated with a geographic identifier corresponding to the particular geographic region; obtaining initial result scores for search results responsive to the search query; determining that the search query matches the local query for the particular geographic region; and determining that at least one of the search results is a local search result, wherein adjusting the initial result score for at least one local search result comprises boosting, using a boost factor, an initial result score for the at least one local search result.

Boosting an initial result score for the at least one local search result can include boosting the initial results score using a boost factor that is proportional to an amount by which the geo-query count exceeds the expected query count. Determining that at least one of the search results is a local search result can include determining that at least one of the search results corresponds to a resource that references a local point of interest or local topic of interest for the particular geographic region. Determining that the search query matches the local query for the particular geographic region can include determining that the search query is an exact match of the local query. Determining that the search query matches the local query for the particular geographic region can include determining that the search query is related variation of the local query.

Methods can further include the actions selecting a presentation order for the search results using the boosted result score, the presentation order specifying a relative presentation position for each search result relative to other search results; and providing, to a user device, data that causes presentation of the search results according to the selected presentation order.

Accessing the search query log can include accessing a search query associated with a geographic identifier that specifies a geographic region corresponding to a user device from which the search query was received. Accessing the search query having a geographic identifier can include receiving a search query having a geographic identifier that represents a location within a specified area, wherein the specified area is represented by a reference location and a specified distance from the reference location.

Methods can further include the action computing the expected query count for the search query based on a total geo-query count for the particular geographic region and a query share for the search query, where the query share represents a portion of the total queries that are expected to match the search query.

Methods can further include the actions obtaining a total query count corresponding to a baseline geographic region; and computing a query share for the search query using a query count corresponding to the search query and the baseline geographic region and the total query count corresponding to the baseline geographic region. Computing the expected query count for the search query can include the actions obtaining the geo-query count corresponding to search query and the particular geographic region; and computing a product of the query share and the geo-query count.

Methods can further include receiving a request for local search queries corresponding to a particular geographic region; and providing, in response to the request for local search queries, data that causes presentation of a threshold number of search queries that have been classified as local search queries.

Particular embodiments of the subject matter described in this specification can be implemented so as to realize one or more of the following advantages. User satisfaction with search results can be increased by emphasizing geographically local search results when a geographically local search query is received from a user device. Search queries that do not have contextually local terms (e.g., such as city names, landmark names, or addresses) are processed as geographically local queries in the presence of a locality signal, and are processed as non-local queries ("global queries") in the absence of a locality signal. As a result, the search results that are generated when the search queries are processed as geographically local queries will provide more emphasis on local search results (e.g., boost local search results in the ranking of the search results and/or highlight local search results) than search results that are generated when the search queries are processed as non-local queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
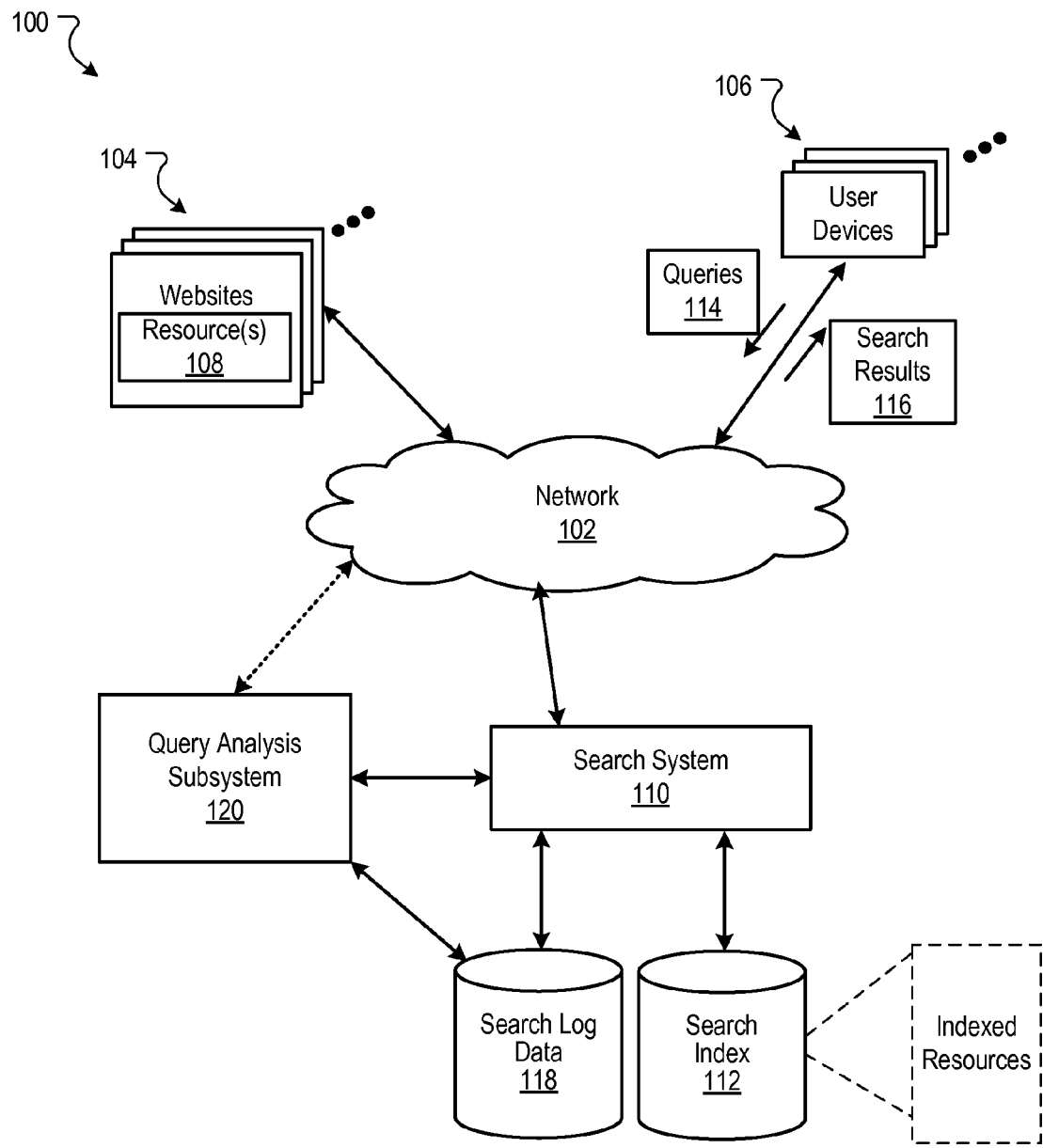
FIG. 1 is a block diagram of an example environment in which a search system provides search services.

A search query is identified as a geographically local ("local") search query for a particular geographic region based on a number of times that the search query is received from users located in the particular geographic region. This quantification is referred to as a geo-query count for the particular geographic region. For example, the geo-query count for a particular geographic region (e.g., a city) can be compared to a corresponding expected query count to determine whether the geo-query count exceeds the corresponding expected query count. If the geo-query count exceeds the expected query count by a threshold, the search query is classified as a local search query for the particular geographic region.

The expected query count is a baseline number of queries that are expected to be received, over a specified period of time, from user devices in the particular geographic region. The expected query count can be computed, for example, based on a query share for the query and total number of queries that have been received from user devices in the particular geographic region, where the query share represents a portion of the total queries that are expected to match the search query. For example, the query share can be computed as a ratio of the number of times that the search query was received from user devices in a baseline, or reference, geographic region (e.g., the United States of America) relative to the total number of queries that have been received from user devices in the baseline geographic region. The query share for the query can be multiplied by the total number of queries received from user devices in the particular geographic region to compute the expected query count for the query.

When a local search query for a particular geographic region is received from a user device in the particular geographic region, initial result scores for local search results are adjusted to increase the likelihood that the local search results will be presented at more prominent presentation locations. For example, a boost factor can be used to boost initial result scores for the local search results. A local search result is a search result that references resources that, in turn, reference local points of interest or local topics of interest for a particular geographic region (e.g., a geographic region representing a locality of a user device that submitted the search query.). A presentation order for the search results is selected using the initial result scores for non-local search results (i.e., not geographically local search results) and the boosted result scores for the local search results. In turn, data that causes presentation of the search results according to the selected presentation order is provided to the user device that provided the local query.

In some implementations, a query analysis subsystem can classify search queries as local queries and boost initial result scores for local search results when local queries are received. The query analysis system can be implemented as a data processing apparatus that includes one or more processors configured to classify search queries and/or boost initial result scores for local search results in response to receipt of a local query. In some implementations, the query analysis subsystem can be implemented as an element of a search system. In other implementations, the query analysis subsystem is implemented in a data processing apparatus that communicates over a network with the search system.

FIG. 1 is a block diagram of an example environment 100 in which a search system 110 provides search services. The example environment 100 includes a network 102, e.g., a local area network (LAN), wide area network (WAN), the Internet, or a combination of them, connects publishers 104, user devices 106, and the search system 110. The environment 100 may include many thousands publishers and user devices 106.

A web site 104 is one or more resources 108 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 108 is any data that can be provided by the web site 104 over the network 102 and that is associated with a resource address. Resources 108 include HTML pages, word processing documents, and portable document format (PDF) documents, images, video, and feed sources, to name just a few. The resources can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 108, the search system 110 identifies the resources 108 by crawling and indexing the resources 108 provided by the publishers 104. Data about the resources 108 can be indexed based on the resource 108 to which the data corresponds. The indexed and, optionally, cached copies of the resources 108 are stored in a search index 112.

The user devices 106 submit search queries 114 to the search system 110. In response, the search system 110 accesses the search index 112 to identify resources 108 that are predicted to be relevant to the search query 109, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search queries 114 submitted during user sessions are stored in a data store such as the search log data store 118. Selection data specifying actions taken in response to search results 116 provided are also stored in a data store such as the search log data store 118. These actions can include whether a search result was selected by a user. In some implementations, location data specifying a locality of the user device that submitted the search query can also be stored in the search log data store 118. The data stored in the search log data store 118 can be used to map search queries 114 submitted during search sessions to resources 108 that were identified in search results 116 and the actions taken by users.

Search results 116 are selected to be provided to a user device 106 in response to a search query 114 based on initial result scores. Result scores are scores that represent a measure of relevance (i.e., a predicted relevance) of the resource 108 to a search query. For example, a result score for a resource 108 can be computed based on an information retrieval ("IR") score corresponding to the resource 108, and, optionally, a quality score of the resource 108 relative to other available resources. A presentation order for the search results 116 can be selected based on the result scores. In turn, data that causes presentation of the search results 116 according to the presentation order can be provided to the user device 106.

In some implementations, the relevance of a particular resource to a particular search query can be determined, in part, through statistical analysis of search log data 118. Search log data is data that specifies search queries received from users and subsequent user selections (i.e., clicks) of particular search results. For example, search log data store 118 may specify that the search query "football" was received from 1,000,000 users, and that 100,000 of these users subsequently selected a search result referencing a web page for a professional football league, while 150,000 of these users selected a web page for a college football league.

Statistical analysis of queries and subsequent user selections of search queries may reveal that when a user submits the search query "football," there is a high likelihood that the user is interested in receiving a search queries referencing a professional football league web page or a college football league. Accordingly, users overall may be satisfied with search results that present search results referencing the web page for the professional football league and the college football league near the top of the search results.

Although many users may be satisfied with the search results that are generated and presented as described above, there are situations where using additional information can improve the quality of search results for particular users. For example, a particular user that is located in Canton, Ohio and submits the search query "football" may actually be interested in information about the Professional Football Hall of Fame (PFHF), which is located in Canton, Ohio. However, the search result referencing the PFHF may be listed near the bottom of the search results page, based on the statistical analysis described above. Thus, a user may be required to scroll down (or navigate to a second search results page) to see the search result for the PFHF.

In this situation, the search query may be a geographically local search query. If the search query is a geographically local search query, then the search system 110 will emphasize the search result for the PFHF. For example, assume a larger percentage of "football" search queries were received from users in Canton, Ohio, relative to a baseline percentage of users that submit "football" queries. This can be interpreted as a signal that there may be a local attraction or other point of interest for which users in the Canton, Ohio area are searching. Thus, the search results provided to users from the Canton, Ohio area are adjusted to emphasize search results that reference Canton points of interest. For example, the search result for the PFHF will be presented at higher presentation positions than it might otherwise be presented if the search query "football" was processed as a non-local query.

In some implementations, the search system 110 includes a query analysis subsystem 120 that is configured to identify, for a particular geographic region, search queries that are received more often than they are expected to be received. Such search queries are referred to as local queries for that geographic region. In turn, when these local queries are received from users in the particular geographic region (or regions that otherwise correspond to the particular geographic region), the query analysis subsystem 120 adjusts initial result scores so that local search results (i.e., search results referencing resources that reference local points of interest or local topics of interest for the particular geographic region) are emphasized (e.g., presented at higher presentation positions than they might have been otherwise) relative to non-local search results (i.e., search results that have not been classified as local search results). The processes by which the query analysis subsystem 120 classifies queries as local queries and causes local queries to be presented at higher presentation positions on a search results page are described below.

Figure 2A:
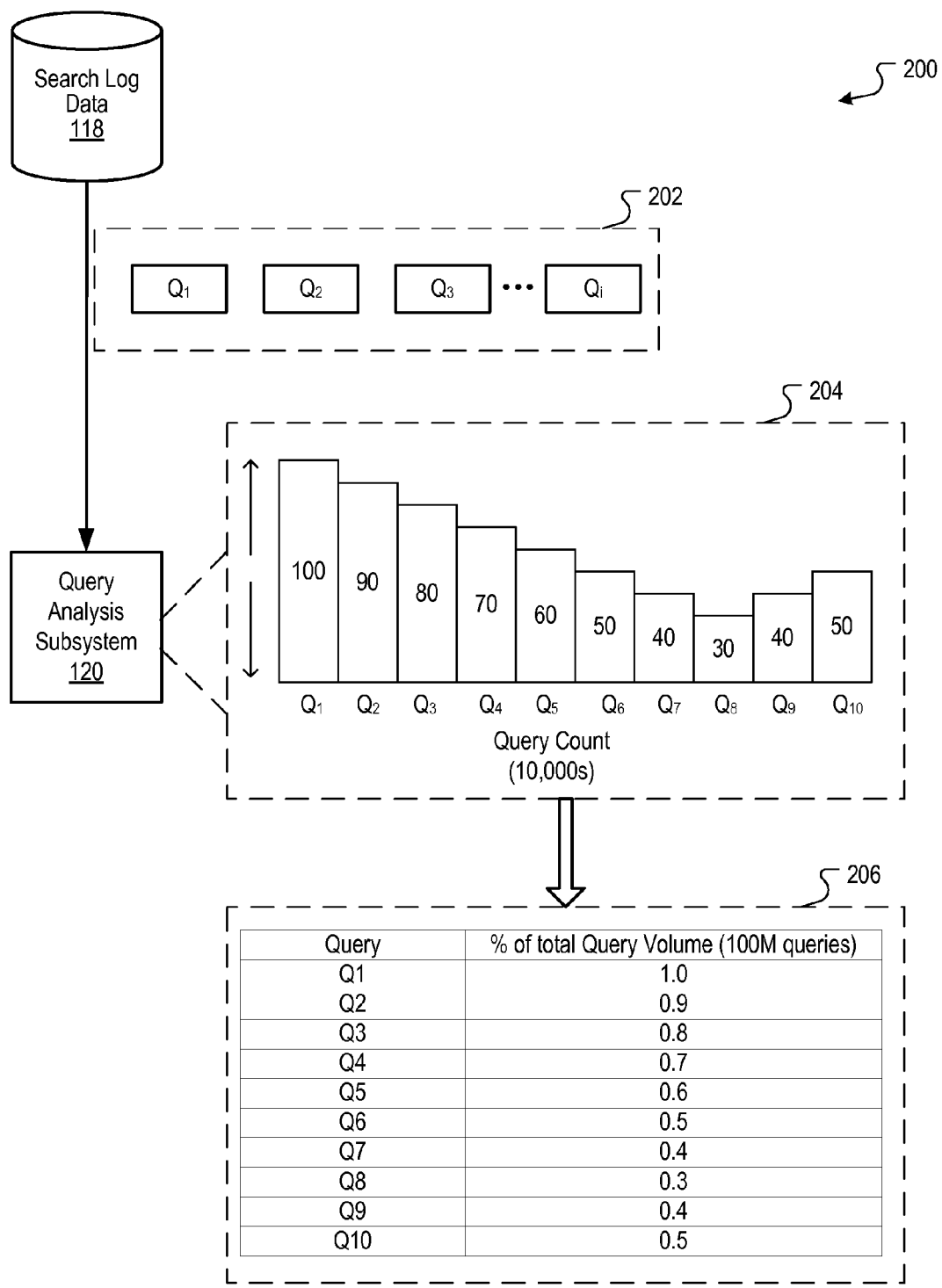
FIGS. 2A and 2B are block diagrams illustrating data flows corresponding to classification of search queries as geographically local queries.
Figure 2B:
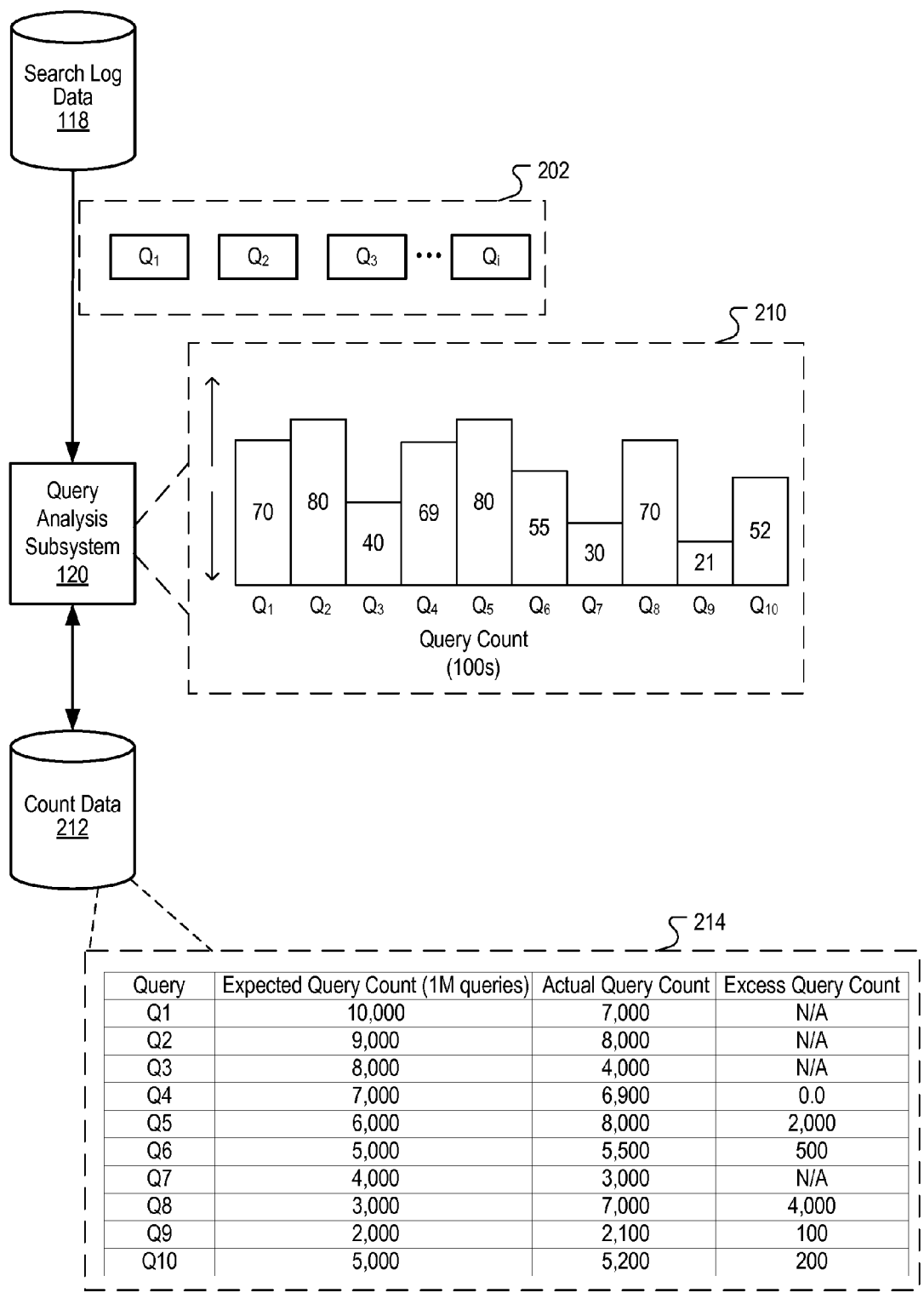

FIGS. 2A and 2B are block diagrams illustrating data flows corresponding to classification of search queries as local queries. The query analysis subsystem 120 receives search log data 202 from the search log data store 118. The search log data 202 includes queries (Q1-Qi) that were received from users, and data specifying the locations from which the queries were received. In some implementations, the search log data can include all queries that were received from users in a baseline (or reference) geographic region. For example, the search log data 202 can include search queries that were received from all users within the continental United States. In some implementations, the search log data 204 include only queries that were received from users at least a threshold a minimum number of times. For example, the queries included in the search log data 202 can include queries that were received at least a statistically relevant number of times (e.g., relative to a total number of queries received).

In some implementations, the search log data 202 received by the query analysis subsystem is a set of search queries that were received from users over a specified period. The specified period can be, for example, a specified amount of time or a specified number of events. For example, the search log data can include or specify search queries that were received from users over a previous calendar month (or year) or the past 100,000,000 search queries that have been received.

Search log data 202 that includes search queries received, for example, over a past week or month can be used to identify more recent increases for a particular query because the increase will be a more significant portion of the total number of queries in the search log data 202 than when the search log data 202 includes queries that were received over a longer time period. Conversely, search log data 202 that includes search queries over several months or years can be used to identify query counts that are less susceptible to change based on a temporary increase in search traffic. In some implementations, the search query data 202 includes search log data 202 that includes search queries received over a past year, and the query analysis subsystem 120 filters the data to obtain subset of the search log data (e.g., search queries that were received over a past week or month).

The query analysis subsystem 120 analyzes the search log data 202 to obtain a query landscape 204 for the search log data 202. A query landscape is a collection of queries and a corresponding number of times that the search query was received from user devices. In some implementations, the query landscape can be obtained using a subset of the search log data 202. For example, the query landscape can be obtained by selecting a threshold number queries that were received more often than the remaining queries. For illustrative purposes only, 10 queries are selected in FIG. 2A; however, thousands or even millions of queries could be selected for the query landscape. Alternatively, the query landscape could also include each query that was included in the search log data 202.

The query landscape 204 includes a reference to the ten queries and a corresponding number of times that each query was received from user devices over the specified period. For example, according to the query landscape 204, Q1 was received 1,000,000 times over the specified period while Q7 was received 400,000 times over the specified period.

Using the query landscape 204, the query analysis subsystem 120 determines a set of query shares 206 that includes a query share for each of the queries (Q1-Q10) in the landscape. A query share for a query is a measure of the query count for the query relative to the total number of queries that were received. For example, the total number of queries that were can be each of the queries specified by the search log data as being received over a specified period. In some implementations, the query share for each query (Q1-Q10) can be computed as a ratio of the query count relative to the total number of queries (i.e., Query Share=Query Count/Total Queries received over specified period). For example, the query share for Q1 has been computed to be 1.0% (i.e.,  1,000,000/100,000,000), and the query share for Q7 has been computed to be 0.4% (i.e., 400,000/100,000,000).

Referring now to FIG. 2B, the query analysis subsystem 120 also analyzes the search query log 202 to identify search queries that were received from user devices located in a particular geographic region. As describe above, each query can have a corresponding geographic identifier that specifies a location of the user device that submitted the query and the query analysis subsystem 120 can use these geographic identifiers to filter the search query data 202 to select only queries that were received from user devices in a particular geographic region.

In some implementations, the corresponding geographic identifier for each query can correspond to or specify a latitude and a longitude representing the location of the user device that submitted the search query. The geographic identifier can also be a zip code corresponding to the location of the user device that submitted the query, a city in which the user device is located, or an area that is represented by a reference location and a specified distance from the reference location (e.g., a distance from a city center), or some other geographic identifier.

A latitude and longitude for each query can be obtained based on user profile data provided by the user and/or an anonymized Internet Protocol (IP) address (e.g., a hash value computed using the IP address) corresponding to the user device. When the user device is a mobile device (e.g., cell phone, Personal Data Assistant, smart phone, or other portable data communications device) the location of the user device can also be provided by location-based services (e.g., GPS) that have been enabled for the phone.

Using the geographic identifiers, the query analysis system can determine a total number of queries that have been received from user devices in the particular geographic region. For example, the query analysis subsystem 120 can compute a sum of all queries received from user devices located in the particular geographic region over the specified period. The query analysis subsystem 120 can also determine, for each search query received over the specified period, a geo-query count. A geo-query count is a value that represents a total number of times that one or more queries were received from user devices in the particular geographic region. The query analysis subsystem 120 can compute, for the specified period, a total geo-query count that represents a total number of search queries that were received from user devices in the particular geographic region.

The geo-query counts for the queries can be used to obtain a geo-query landscape 210 that is a collection of queries received for a particular geographic region and corresponding numbers of times that the queries were each received from user devices in the particular geographic region. For example, the geo-query landscape 210 specifies that Q1 was received 7,000 times and that Q8 was received 8,000 times. The geo-query landscape 210 can be stored, for example, in a count data store 212. The geo-query counts obtained from the geo-query landscape 210 can be indexed, for example, based on the query to which they correspond. For example, table 214 lists the geo-query count for the queries (Q1-Q10) in the column titled "Actual Query Count."

The query analysis subsystem 120 can use the total geo-query count for a particular geographic region to obtain an expected query count for each of the queries. In some implementations, the query analysis subsystem 120 can obtain the expected query count for each query by multiplying the total geo-query count by the query share that was computed for the query (i.e., (expected query count)=(total geo-query count)* (query share)). For example, the expected query count for Q1 is computed to be 10,000 (i.e., 10,000=1,000,000*0.01) and the expected query count for Q8 is computed to be 7,000 (i.e., 7,000=1,000,000*0.007). The expected query counts for the queries can be stored, for example, in a count data store 212 and indexed based on the query to which the expected query counts correspond. For example, the table 214 lists the expected query counts for the queries (Q1-Q10) in the column titled "Expected Query Count."

The query analysis subsystem 120 compares the geo-query counts for each of the queries to the corresponding expected query count for the query to determine whether the geo-query count for the query exceeds the expected query count. For example, comparing the geo-query counts to the expected query counts reveals that the geo-query counts for Q1-Q4 and Q7 fail to exceed the corresponding expected query counts for these queries, but that the geo-query counts for Q5, Q6, and Q8-Q10 do exceed the corresponding expected query counts for these queries. Thus, queries Q5, Q6, and Q8-Q10 from the particular geographic region were submitted in excess of what is expected. Thus these queries may be locally significant queries for the particular geographic region, and may qualify to be classified as local queries.

In some implementations, the query analysis subsystem 120 can classify, as a local query, any query having a geo-query count that exceeds the corresponding expected query count. In other implementations, the query analysis subsystem 120 can require that a local query be a query for which the geo-query count exceeds the corresponding expected query count by at least a threshold amount.

For example, the query analysis subsystem 120 can require that the geo-query count exceed the expected query count by a specified percentage (e.g., 20%) or by an absolute number (e.g., 1,000). The query analysis subsystem 120 can also require that each query that is classified as a local query be one of N queries (e.g., 10, 100 or 1,000 queries) having geo-query counts that exceed the corresponding expected query counts by the highest amount. Assuming that the query analysis subsystem 120 requires local queries to have a geo-query count that exceeds the expected query count by at least 40%, Q5 and Q8 would qualify to be classified as local queries for the particular geographic region. Thus, in response to receiving a new query that is identified as being received from a user device in the particular geographic region and matches either Q5 or Q8, the query analysis subsystem 120 can boost the initial result scores for local search results that are responsive to the new query, as describe below.

As described above, search queries can be received from a number of different user devices (e.g., desktop personal computers or mobile devices). However, users that submit queries from a cell phone are generally more likely to be searching for local search results than users that submit queries from a desktop computing device. Therefore, the query landscapes for queries submitted using mobile devices can be substantially different than the query landscapes for queries submitted using other devices.

In some implementations, a query landscape can be generated using search queries that were received from mobile user devices (e.g., cell phones), and a separate query landscape can be generated using search queries that were received from other user devices (e.g., personal computers). In other words, the query landscapes are partitioned according to the different types of devices that were used to submit the queries. In these implementations, separate query shares (e.g., a mobile device query share and a query share for other non-mobile devices) can be generated using the separate query landscapes. In turn, separate expected query counts (e.g., a mobile expected query count and an expected query count for other non-mobile devices) can be computed using the separate query shares and the total geo-query count for the particular geographic region. Once the separate expected query counts have been computed, a particular search query can be classified as a local and/or non-local query using the separate expected query counts.

For example, if the particular search query has been received from non-mobile user devices, located in the particular geographic region, more than the expected non-mobile query count, then the particular search query can be classified as a local query for non-mobile devices. However, if the particular search query has been received from mobile user devices, located in the particular geographic region, less than the expected mobile query count, the particular search query will not be classified as a local query for mobile devices.

In this example, when a new search query is received that matches the particular search query, the initial result scores for local search results responsive the search query can be boosted if the search query is received from a non-mobile device, but not boosted when received from a mobile device. Thus, the final result scores for the search result will depend on whether the search query was received from a mobile user device, or a non-mobile user device. Alternatively, the final result scores for the search results can be a combination (e.g., average or weighted average) of the boosted result scores and the initial result scores irrespective of whether the user device from which the search query was received is a mobile user device or a non-mobile user device.

In some implementations, the query analysis subsystem 120 can be configured to receive a request for local search queries and provide, in response to the request, a list of search queries that have been classified as local queries for a particular geographic region corresponding to the request. The request for local search queries can correspond, for example, to user selection of a local query request object provided in a user interface. The local query request object can be hyperlinked text, a hyperlinked image, or another hyperlinked object that, upon selection, initiates a request for local queries corresponding to a particular geographic region (i.e., locality) corresponding to the user device from which the query request object is selected. In response to the request for local queries, data that causes presentation of at least a threshold number of local queries corresponding to the particular geographic region can be provided. For example, N local search queries having a geo-query counts that are the N-highest geo-query counts relative to their respective expected query counts can be presented. Alternatively, the N search queries can be local search queries having the highest N excess query ratios, where an excess query ratio is computed as a ratio of a geo-query count relative to a corresponding expected query count (i.e., excess query ratio for query(i)=geo-query count (i)/expected query count(i)).

The request for local search queries can also correspond to submission of a search query that matches a local query for the particular geographic region. For example, when a search query that matches a local search query for the particular geographic region is received, it can initiate a request for local search queries. In turn, a threshold number of local search queries for the particular geographic region can be selected for presentation. The local search queries that are selected for presentation can be, for example, as described above. Once the local search queries are selected, data that cause presentation of the selected local queries can be provided in response to the request for local search queries.

The data can cause the selected local queries to be presented in a portion of a display page that is separately partitioned and/or labeled differently (e.g., presented in a side column of the page with a header that reads "local search queries for your location") relative to another portion of the display page in which search results for the search query are presented.

The description that follows describes methods that can be performed to facilitate classification of search queries as local search queries, and adjustment of initial result scores for local search results. These processes are described with reference to a single set of query data for each query (e.g., a single search query log, query share, query count, expected query count, and geo-query count). These processes can also be performed using separate sets of query data for queries received from mobile devices and queries received from non-mobile devices.

Figure 3:
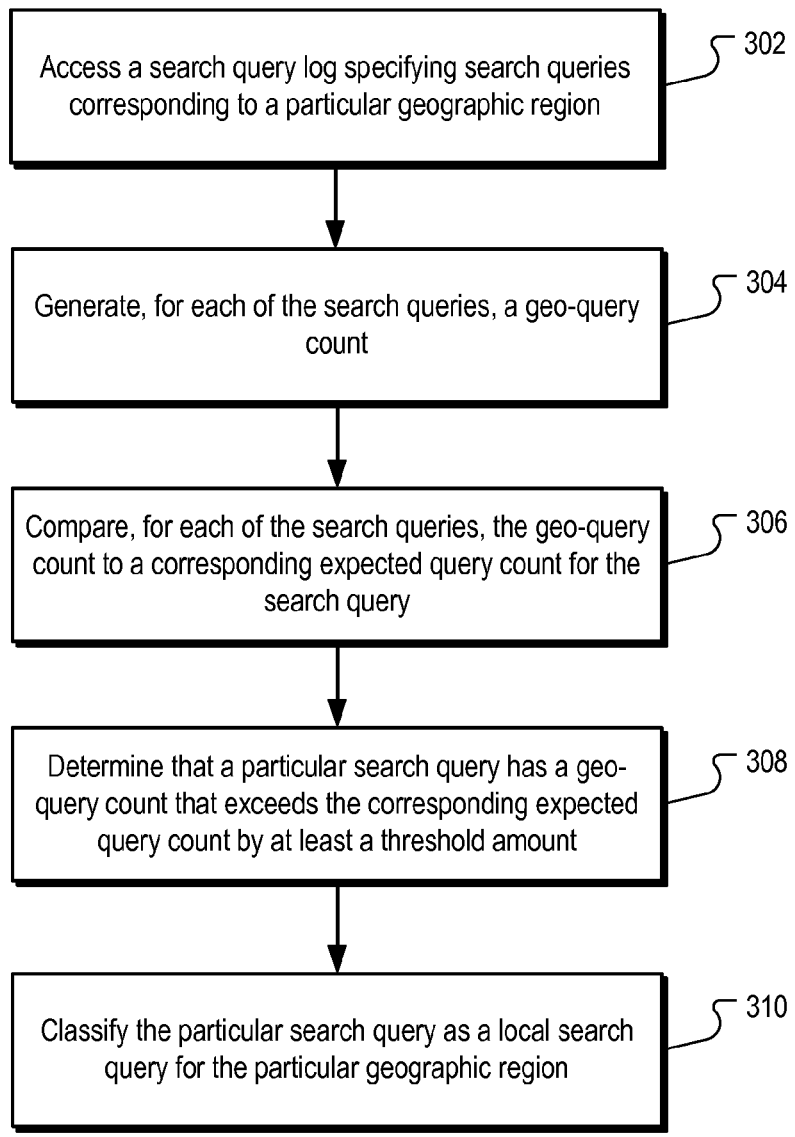
FIG. 3 is a flow chart of an example process for classifying search queries as geographically local queries.

FIG. 3 is a flow chart of an example process 300 for classifying search queries as local queries. The process 300 is a process by which geo-query counts for queries included in a search query log for a particular geographic region are obtained and compared to expected query counts for the queries. A determination is made that at least one of the search queries has a geo-query count that exceeds the expected query count. In turn, search queries having a geo-query count that exceed the expected query count are classified as local queries for the particular geographic region.

The process 300 can be implemented, for example, by the query analysis subsystem 120 and/or the search system 110 of FIG. 1. In some implementations, the query analysis subsystem 120 is a data processing apparatus that includes one or more processors that are configured to perform actions of the process 300. In other implementations, a computer readable medium can include instructions that when executed by a computer cause the computer to perform actions of the process 300.

A search query log specifying search queries corresponding to a particular geographic region is accessed (302). In some implementations, the search query log includes the queries that have been identified as queries that were received from user devices located in the particular geographic region. In other implementations, the search query log includes search queries that have been received from many different geographic regions. In these implementations, the search query log can be filtered to select the search queries that are identified ad queries received from a user device in the particular geographic region.

For example, as described above, each search query can have a geographic identifier appended to or otherwise associated with it, where the geographic identifier represents a location of the user device that submitted the search query. In these implementations, search queries for a particular geographic region can be selected by filtering the search query log to remove search queries that do not have the geographic identifier representing the particular region. Thus, the search queries that remain in the filtered search query log will each correspond to the particular region.

A geo-query count is generated for each of the search queries corresponding to the particular geographic region (304). As described above, the geo-query count for a search query represents a total number of times that the search query was received, for example, over a specified period. The geo-query count can be computed based on a number of instances of the search query in the search query log that have the geographic identifier corresponding to the particular region. The geo-query count can also be obtained from the search query log. For example, the search query log can include a reference to the search query and a value representing a number of times that the search query was received from user devices in the specified geographic region and/or other geographic regions.

The geo-query count for each of the search queries is compared to a corresponding expected query count for the search query (306). In some implementations, the expected query count is a baseline number of times that the query is expected to be received, over a specified period, from user devices located in the specified geographic region. As described above, the expected query count for a query can be computed based on a query share for the query and a total number of queries that were received, over the specified period, from user devices located in (or corresponding to) the specified geographic region.

A determination is made that a particular search query has a geo-query count that exceeds the corresponding expected query count by at least a threshold amount (308). As described above, the threshold amount can be expressed as a percentage of the expected query, an absolute number, or a measure of the magnitude by which the search query exceeds the corresponding expected query count relative to the magnitude by which other search queries exceed corresponding expected query counts (e.g., N queries having geo-query counts that have the highest geo-query counts relative to the corresponding expected query counts).

In response to the determination, the particular search query is classified as a local search query for the particular location (310). In some implementations, classifying the search query as a local search query for the particular location includes appending a local query identifier to the search query and/or storing the search query in a data store that stores local queries. The local query identifier can include a reference to the particular geographic region for which the search query is a local query.

For example, the local query identifier can specify a city, a zip code, or a reference location and distance (e.g., city center location and radial distance) that corresponds to the particular geographic region. Appending a local identifier to the search query facilitates identification of the search query as a local query for the particular geographic region. A single search query can be a local query for more than one location, such that the search query can have more than one local query identifier appended to it. Local queries for a particular geographic region can also be indexed in a data store based on the particular geographic region.

Once a search query has been classified as a local query for a particular geographic region, queries that are subsequently received from user devices in the particular geographic region can be analyzed to determine whether the newly received queries match the local query. When a newly received search query matches the local query, initial result scores for search results responsive to the local query can be adjusted to emphasize local search results. For example, initial result scores for local search results can be increased using a boost factor, or initial result scores for non-local search results can be reduced using a boost factor so that the local search results are more prominently displayed (e.g., presented in higher presentation positions).

Figure 4:
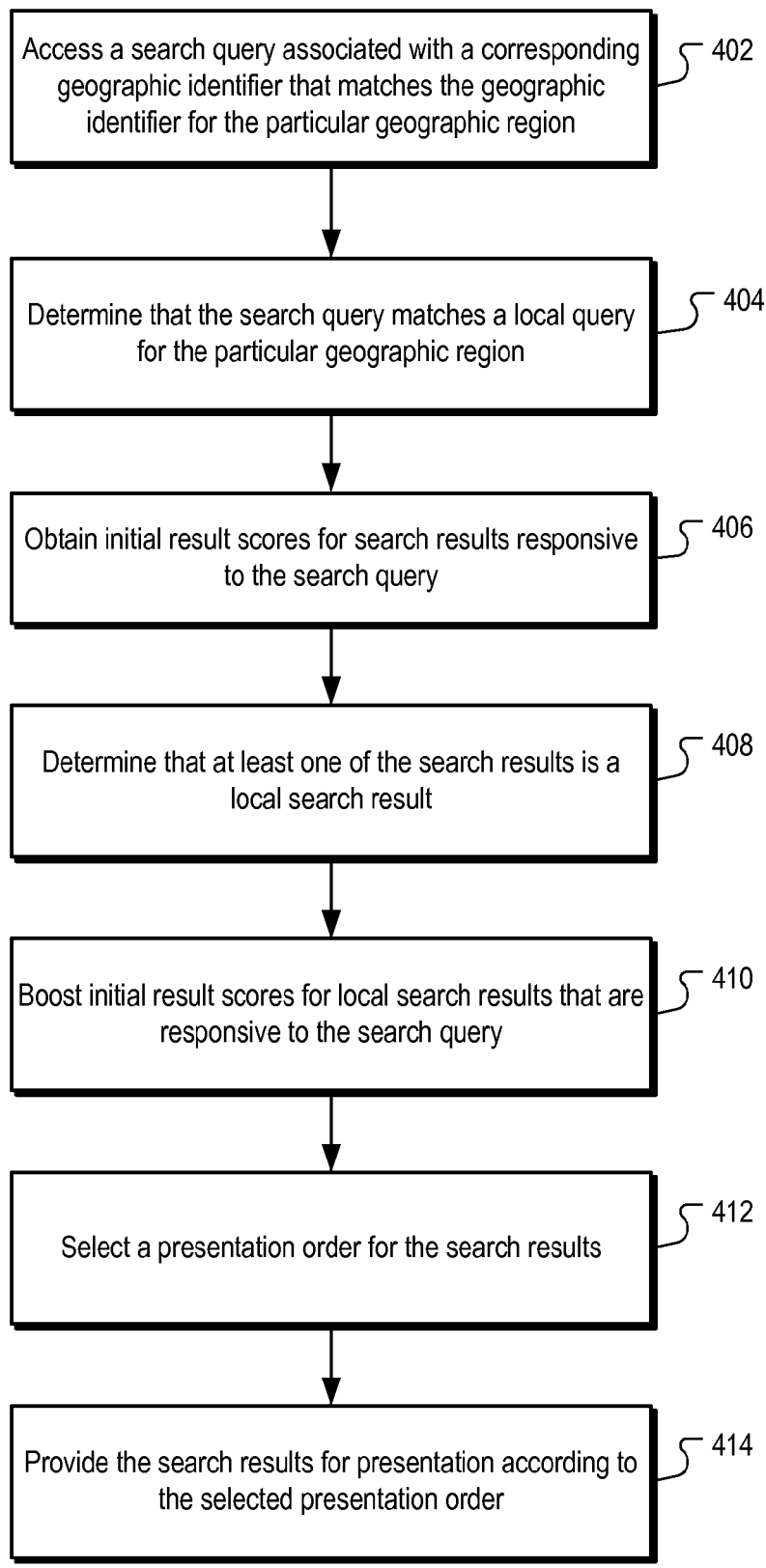
FIG. 4 is a flow chart of an example process for emphasizing geographically local search results for a geographically local query.

FIG. 4 is a flow chart of an example process 400 for emphasizing local search results for a local query. The process 400 is a process by which a search query that matches a local query is received from a user device located in the particular geographic region corresponding to the local query. Search results responsive to the search query are selected and initial result scores for the search results are obtained. A determination is made that at least one of the search results is a local search result, and the initial result score for the local search result is adjusted using a boost factor. In turn, a presentation order is selected for the search results using the boosted result score, and the search results are provided for presentation according to the presentation order.

The process 400 can be implemented, for example, by the query analysis subsystem 120 and/or the search system 110 of FIG. 1. In some implementations, the query analysis subsystem 120 is a data processing apparatus that includes one or more processors that are configured to perform actions of the process 400. In other implementations, a computer readable medium can include instructions that when executed by a computer cause the computer to perform actions of the process 400.

A search query having a corresponding geographic identifier that matches the geographic identifier for the particular geographic region is accessed (402). Geographic identifiers can be included with the search query when the search query is receive from the user device, or appended to the search query, for example, by a search system or a query analysis subsystem. In some implementations, the corresponding geographic identifier for the query matches the geographic identifier for the particular geographic region by being the same identifier. For example, if the geographic identifier for the particular geographic region is a city name (e.g., Atlanta, Ga.), a matching corresponding geographic identifier will include the same city name (e.g., Atlanta, Ga.).

In other implementations, the corresponding geographic identifier can also match the geographic identifier for the particular geographic region by having a geographic identifier that includes any reference to the particular geographic region (e.g., zip code) or includes a reference to a location that is within a specified distance of a the particular geographic region. For example, if the particular geographic region includes the city of Canton and all areas within 50 miles of the center of Canton, then geographic identifiers for queries that reference the city of Canton, Ohio (e.g., zip code 44702), or locations within 50 miles of the city of Canton, (e.g., Akron, Ohio), will match the geographic identifier for the Canton region.

A determination is made that the search query matches a local query for the particular geographic region (404). In some implementations, the search query can match a local query by having the same text as the local query. For example, if the local query is "football," then the search query can match the local query by including the text "football." In other implementations, related variations of the query football that have at least a minimum specified similarity (e.g., synonyms, plurals, or other related terms) can also match the local query "football." Additionally, queries that have been identified to return similar search results as the local query "football" can also match the local query "football."

Initial result scores are obtained for search results responsive to the search query (406). As described above, a result score is a score upon which a presentation order for search results is determined. In some implementations, initial result scores for the search results are obtained from a search system that has computed the result scores for the search results and, optionally, selected the search results for presentation using the search results. In some implementations, the search results to which the initial result scores are also obtained from the search system.

A determination is made that at least one of the search results responsive to the search query is a local search result (408). A local search result is a search result that has been determined to have a local interest or include content describing landmark or particular entity for a particular geographic region. The local interest can be determined, for example, from content of the search result, content of the resource to which the search result links, or from user actions. For example, local interest for a search result can be inferred based on a substantially higher click rate for the search result when presented to users in the particular geographic region relative to the click rate in other regions. Additionally, the content (e.g., text) of the web page to which the search result links can be analyzed to determine whether location specific information (e.g., an address, phone number, or other location information) is available. If location specific information is available, this information can be used to determine whether the search result is a local search result.

Initial result scores for local search results that are responsive to the search query are boosted (410). In some implementations, the initial result scores are boosted using a boost factor. A boost factor is a value that can be used to adjust an initial result score when a search result corresponding to the initial result score satisfies a boost condition. For example, a local query boost factor can be a value (e.g., 0.1-2.0) that is multiplied with the initial result score for a local result in response to the determination that a search query is a local query. When a local search result is to be emphasized relative to other search results (e.g., non-local search results), the boost factor can be a value greater than 1.0, such that the initial result score for the local search result is increased relative to the initial result scores for the other search results. Increasing the result scores of local search results is discussed, but local search results can also be emphasized by reducing the result scores of the other search results relative to the result scores for local search results.

In some implementations, the boost factor that is used to boost initial result scores has a default value that is used to boost each local search result irrespective of the local query to which the local search result is responsive. In other implementations, the value of the boost factor can be query-specific. In these implementations, the value of the boost factor can be selected based on an amount by which the geo-query count for the local query exceeded the corresponding expected query count or threshold. For example, a boost factor for a local query having a geo-query count that is 75% higher than its corresponding expected query count can have a higher value than a boost factor for a local query having a geo-query count that exceeds its corresponding expected query count by a lower percentage (e.g., 40%).

A presentation order is selected for the search results (412). In some implementations, the presentation order for the search results is selected based on the boosted result scores for the local search results and the initial result scores for the non-local search results. The presentation order specifies a relative presentation position for each search result relative to the other search results that have been selected for presentation. For example, the presentation order can specify that a search result having a highest result score is presented in a more prominent presentation location of the search results page than the other search results and that each next highest scoring search result (e.g., based on the result scores) be respectively presented in a next most prominent presentation location.

The search results are provided for presentation according to the selected presentation order (414). In some implementations, the search results can be provided by providing, to a user device that submitted the search query, data that causes presentation of the search results according to the selected presentation order.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A method performed by data processing apparatus, the method comprising:
    identifying a search query from a search query log that includes data specifying search queries corresponding to particular geographic regions;
    generating a geo-query count that represents a total number of times that the search query was received over a specified period in a geographic region;
    comparing the geo-query count to a corresponding expected query count for the search query in the geographic region, wherein the expected query count is a baseline number of times that the search query is expected to be received in the geographic region based on the number of times that the search query is received in a baseline geographic region that is different than the geographic region;
    determining that the search query has a geo-query count that exceeds the corresponding expected query count by at least a threshold amount; and
    classifying the search query as a local query for the geographic region.

2. The method of claim 1, further comprising adjusting an initial result score for at least one local search result that has been selected to be provided in response to receiving the search query, the initial result score being a score used to select an order in which search results provided in response to the search query are presented, and the local search result being a search result that corresponds to the geographic region.

3. The method of claim 1, further comprising:
    receiving a second search query from the geographic region;
    obtaining initial result scores for search results responsive to the second search query;
    determining that the second search query matches the search query;
    determining that at least one of the search results responsive to the second search query is a local search result, and
    boosting the initial result score for the local search result.

4. The method of claim 3, wherein boosting the initial result score for the local search result comprises boosting the initial result score using a boost factor that is proportional to an amount by which the geo-query count for the search query exceeds the expected query count for the search query.

5. The method of claim 3, wherein determining that at least one of the search results responsive to the second search query is a local search result comprises determining that at least one of the search results responsive to the second search query corresponds to a local point of interest or local topic of interest for the geographic region.

6. The method of claim 3, wherein determining that the second search query matches the search query for the geographic region comprises determining that the second search query is an exact match of the search query.

7. The method of claim 3, wherein determining that the second search query matches the search query for the geographic region comprises determining that the second search query is a related variation of the search query.

8. The method of claim 3, further comprising:
    selecting a presentation order for the search results responsive to the second search query using the boosted initial result score for the local search result, the presentation order specifying a relative presentation position for each search result relative to other search results responsive to the second search query; and
    providing, to a user device, data that causes presentation of the search results responsive to the second search query according to the selected presentation order.

9. The method of claim 1, further comprising computing the expected query count for the search query in the geographic region based on a total query count for the geographic region and a query share for the baseline geographic region, where the query share represents a percentage of the number of queries in the baseline geographic region that match the search query.

10. The method of claim 9, wherein computing the expected query count for the search query in the geographic region comprises:
    multiplying the total query count for the geographic region by the query share for the baseline geographic region.

11. A system comprising:
    one or more memory devices storing computer instructions; and
    one or more processors executing the instructions stored in the one or more memory devices in order to:
        receive a search query submitted by a user device;

determine that the search query matches a local query for a particular geographic region corresponding to the user device, wherein the local query is a query having a geo-query count that exceeds an expected geo-query count for the particular geographic region by at least a threshold amount, the geo-query count representing a number of times the query was received in the particular geographic region, and the expected geo-query count representing a baseline number of times that the query was expected to be received in the particular geographic region based on the number of times that the query was received in a baseline geographic region that is different than the particular geographic region; and adjust result scores for local search results that are responsive to the search query.

12. The system of claim 11, wherein the one or more processors further execute instructions to identify search results responsive to the received search query, and to determine initial result scores for the search results.

13. The system of claim 11, wherein the one or more processors executing instructions to determine that the search query matches a local query execute instructions to determine that the search query is at least one of an exact match or a related variation of the local query.

14. The system of claim 11, wherein the one or more processors further execute instructions to determine a presentation order for the search results using the adjusted result scores.

15. The system of claim 11, wherein the one or more processors further execute instructions to determine the expected query count by executing instructions to:

determine a total count of all queries received in the particular geographic region;

determine a query share for the search query in the baseline geographic region based on the number of times that the query was received in the baseline geographic region and a total count of all queries received in the baseline geographic region; and multiply the query share for the search query in the baseline geographic region by the total count of all queries received in the particular geographic region.

16. A computer storage medium encoded with a computer program, the program comprising instructions that when executed by data processing apparatus cause the data processing apparatus to perform operations comprising:

identifying a first search query from a search query log that includes data specifying search queries corresponding to a particular geographic region;

generating a geo-query count that represents a total number of times that the first search query was received over a specified period in a geographic region;

comparing the geo-query count to a corresponding expected query count for the first search query in the geographic region, wherein the expected query count is a baseline number of times that the first search query is expected to be received in the geographic region based on the number of times that the first search query is received in a baseline geographic region that is different than the geographic region;

determining that the first search query has a geo-query count that exceeds the corresponding expected query count by at least a threshold amount; and classifying the first search query as a local query for the geographic region.

\* \* \* \* \*